United States Patent [19]

Balter

[11] Patent Number: 4,885,946
[45] Date of Patent: Dec. 12, 1989

[54] MECHANISM FOR FEEDTHROUGH OF ROTARY AND/OR LINEAR MOTIONS TO A SEALED CHAMBER

[75] Inventor: Valetin Balter, Cupertino, Calif.
[73] Assignee: Huntington Mechanical Laboratories, Inc., Mountain View, Calif.
[21] Appl. No.: 286,613
[22] Filed: Dec. 19, 1988
[51] Int. Cl.[4] .............................................. F16J 15/50
[52] U.S. Cl. ......................................... 74/18.1; 74/63
[58] Field of Search .................. 74/18.1, 63, 570, 10 R

[56] References Cited
U.S. PATENT DOCUMENTS

| | | | |
|---|---|---|---|
| 1,277,193 | 8/1918 | Cassel | 74/63 |
| 4,403,521 | 9/1983 | f'Geppert | 74/18.1 X |
| 4,683,963 | 8/1987 | Balter | 74/18.1 |

Primary Examiner—Joseph Falk
Attorney, Agent, or Firm—David Pressman

[57] ABSTRACT

A rotary motion feedthrough mechanism for an external sealed chamber (206) located outside the mechanism through an inner sealed chamber formed inside the mechanism comprises a first driven shaft (220) with a through opening and a second driven shaft (234) moveably inserted into the through opening of the first shaft. The first shaft (220) carries an eccentric sleeve (242) which is rigidly attached thereto and rotatingly supports on bearings (246 and 248) a cylindrical bushing (244). The bushing (244) in turn supports a cylindrical body (250) which is supported on the bushing by bearings (251 and 253). Cylindrical body (250) is driven into rotation from an external drive means, e.g., manually from a handwheel (266) via a pinion (260) and a gear wheel (256) which is attached to the cylindrical body. Because of eccentricity of the bushing with respect to the axis of rotation of the first shaft (220), the bushing will describe planetary motions with respect to the above-mentioned axis of rotation. The second driven shaft (234) is driven into rotation from an independent rotary feedthrough device (240). For sealing the external sealed chamber (206), both driven shafts are surrounded by the above-mentioned inner sealed chamber which is formed partially by the above-mentioned bushing (244) and stationary sleeve (228), and partially by bellows (268 and 270). Provision of the bellows allows the bushing to describe planetary motions without violating hermetic sealing of the system. For maintaining vacuum conditions, the mechanism is connected to the external vacuum chamber and to the drive unit of the second shaft via appropriate seal rings. In the second embodiment, the rotary motion feedthrough mechanism (240) is replaced by a linear motion feedthrough drive unit (282). In a third embodiment, the second shaft is substituted by a tube (286) and is used for the supply of fluid, e.g., liquid nitrogen from an externally installed fluid feedthrough device (290).

18 Claims, 5 Drawing Sheets

MECHANISM FOR FEEDTHROUGH OF ROTARY AND/OR LINEAR MOTIONS TO A SEALED CHAMBER

BACKGROUND—FIELD OF THE INVENTION

The present invention relates to a motion transmitting device, particularly to such a device which incorporates a seal and can transmit rotary and/or linear motions into an external sealed chamber which is located outside the device and maintained under vacuum or pressure.

CROSS REFERENCE TO RELATED CASE

The device of the present invention is an improvement over the rotary motion feedthrough apparatus disclosed in U.S. Pat. No. 4,683,763, granted to applicant V. Balter on Aug. 4, 1987.

FIG. 1—BACKGROUND—DESCRIPTION OF PRIOR ART

It is often desirable or necessary to rotate objects within a sealed chamber which has a pressure differential with the outside. For instance, when a test specimen, such as a semiconductor wafer, is mounted on a shaft in the chamber, it is often necessary to change the position of the specimen. For this purpose, rotary motion feedthrough mechanisms have been known and used in the past. Specifically, these mechanisms comprise a shaft which extends from inside the sealed chamber to the outside via a rotary feedthrough connection so that shaft can be rotated from outside the chamber. The feedthrough connection is an airtight bearing which retains the pressure differential in the chamber. Such an arrangement is especially useful where it would be impractical to open the chamber merely to rotate the object.

Figure 1:
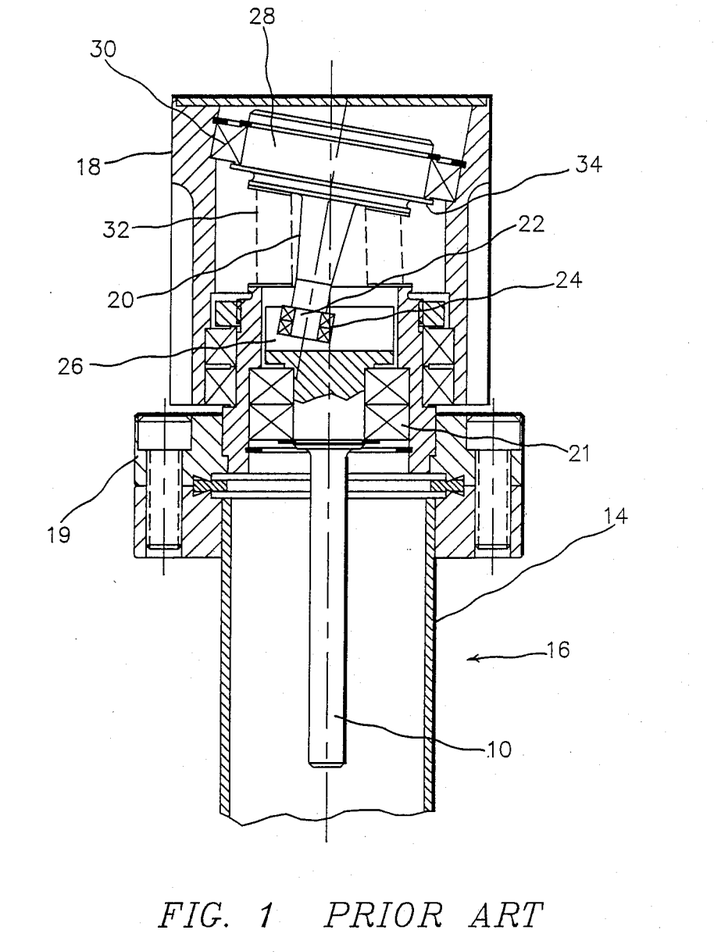
FIG. 1 is a longitudinal sectional view of a prior-art rotary motion feedthrough device.

One such prior-art arrangement is shown in FIG. 1 of the above Balter patent which is a longitudinal sectional view. The mechanism includes a feedthrough shaft 10 which is to be rotated. Shaft 10 is rotatably mounted in a housing 14 of an external vacuum chamber 16 which is located outside the device. The feedthrough mounting for shaft 10 includes a cap 18, a mounting element 19, which is attached to housing 14 of the chamber, and bearings 21 which rotatably support cap 18 on mounting element 19.

The mounting also includes a driver 20 with a stub shaft 22 having bearings 24 at one end thereof. Bearings 24 are received within a diametrical groove 26 formed at an end face of shaft 10. Driver 20 also includes a cylindrical member 28 mounted by a bearing 30 in the inner periphery of cap 18. Such inner periphery has a beveled surface so that cylindrical member 28 and stub shaft 22 wobble when the cap is rotated.

A bellows 32, which extends between mounting element 19 and an enlarged-diameter portion 34 of driver 20, provides the required seal.

When bearings 24 on the outer end of the stub shaft wobble, they move along a circular path surrounding the central axis of shaft 10. This causes shaft 10 to rotate in the direction of movement of bearings 24 on the driver. The cap can either be a manually rotated knob, a stepper motor, or a structural part for coupling the knob to a stepper motor. The mechanism of the type described above can be used, e.g., in manipulators for rotating samples within an external vacuum chamber.

Although the above-described mechanism is simple and rugged in construction and reliably transmits rotary motion from outside to a driven shaft located within the external sealed chamber, it nevertheless has some drawbacks. Specifically, this mechanism can transmit only a single rotary motion and is unsuitable for transmitting two or more independent rotary motions on two shafts, or a rotary motion combined with axial movement. In other words, the prior-art device is not universal and can provide only one degree of freedom of motion, i.e., rotation. Another disadvantage is that the device is completely closed and will not allow gas or liquid to flow from an outside source to the interior of the external sealed chamber. Such fluid, however, may be required, e.g., for cooling.

OBJECTS AND ADVANTAGES OF THE INVENTION

It is accordingly an object of the invention to provide a rotary-motion feedthrough mechanism which is simple in construction and universal in use. Another object is to provide the above-mentioned mechanism which can transmit two or more independent motions to within an external sealed chamber. A further object is to provide a device of the above-mentioned type which can transmit rotary motion(s) in combination with translatory motion(s) and which is suitable for supplying fluids into the external sealed chamber. A still further object is to provide a combined rotary and/or linear motion feedthrough mechanism which utilizes only metal seals that can be subjected to high or low temperatures. Yet further objects and advantages will become apparent after consideration of the ensuing description and the accompanying drawings.

REFERENCE NUMERALS USED IN THE DESCRIPTION AND DRAWINGS

10—driven shaft
14—housing of an external vacuum chamber
16—external vacuum chamber
18—cap
19—mounting element
20—driver
21—bearings
22—stub shaft
24—bearings
26—groove
28—cylindrical member
30—bearing
32—bellows
34—enlarged-diameter portion
200—feedthrough mechanism
202—first mounting flange of feedthrough mechanism
204—mounting flange of external vacuum chamber 205—seal
206—external vacuum chamber
208—bolt
210—stationary cylindrical housing
212, 214, 216—windows
218—second mounting flange
220—first driven shaft
222—bearing
224, 226—bearings
228—stationary sleeve
230—welding
232—spacer
234—second driven shaft
236, 238—bearings
240—second feedthrough device
241—mounting flange
242—eccentric sleeve
243—seal
244—cylindrical bushing
246, 248—bearings
250—external cylindrical body
251, 253—bearings
252, 254—bearings
256—gear gear wheel
258—bolt
260—pinion
262—housing
264—shaft
266—handwheel
268—first bellows
270—second bellows
272—rotary motion feedthrough mechanism
274—vacuum chamber
276—sliding rod
278, 280—sliding bearings
282—axial drive unit
284—rotary motion feedthrough mechanism
286—tube
288—external vacuum chamber
290—fluid feedthrough mechanism

Figure 2:
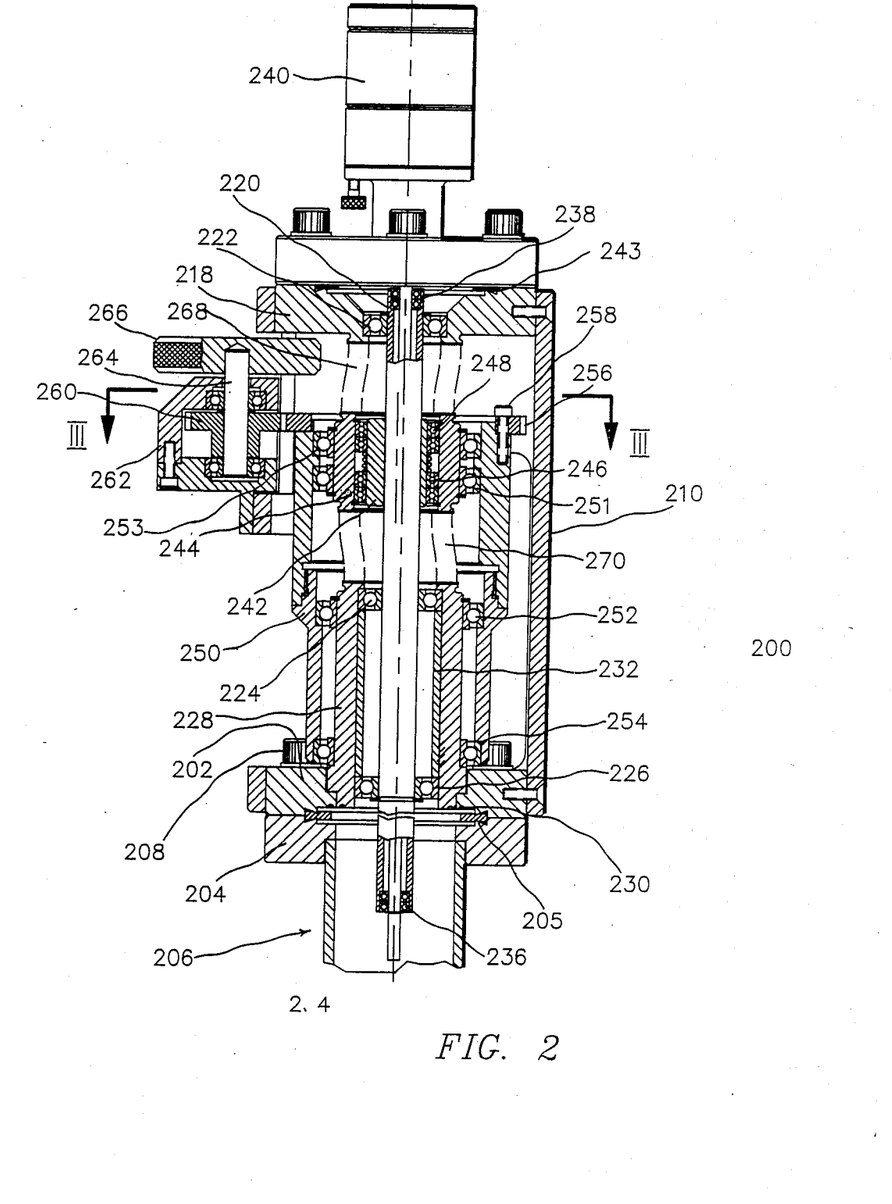
FIG. 2 is a longitudinal sectional view of a rotary motion feedthrough device of one embodiment of the invention.
Figure 3:
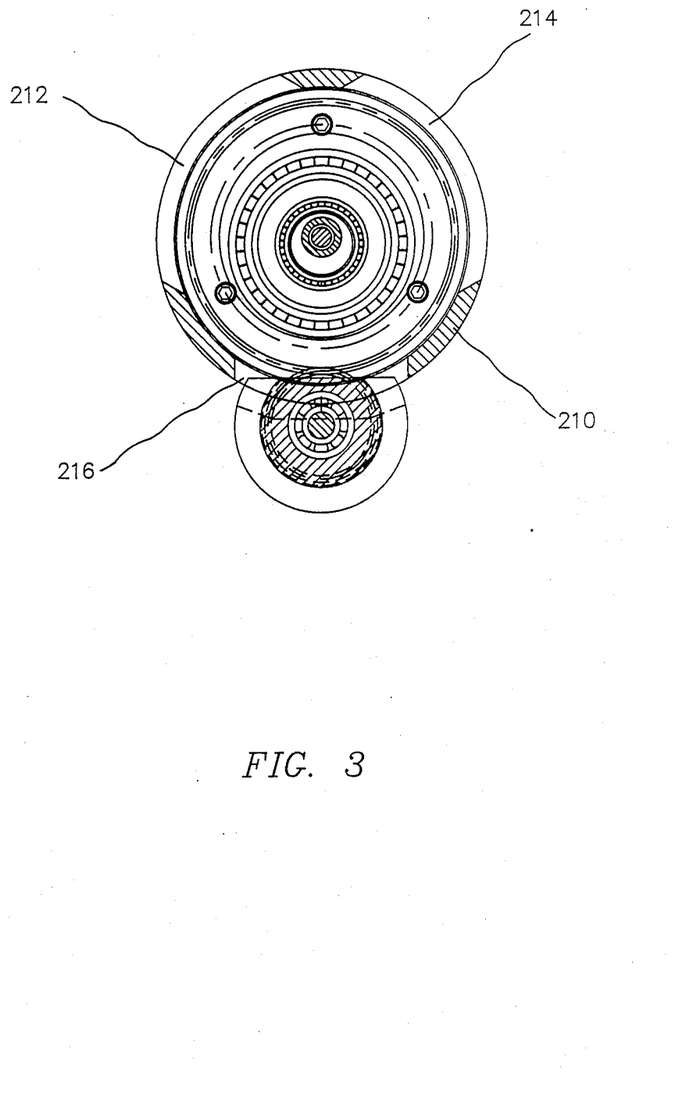
FIG. 3 is a sectional view along lines III—III of FIG. 2.

FIGS. 2 AND 3—ROTARY MOTION FEEDTHROUGH DEVICE FOR TWO INDEPENDENT ROTARY MOTIONS

A feedthrough mechanism or device of the present invention is broadly denoted by reference numeral 200 (FIG. 2) and includes a mounting flange 202 for attachment to a flange mounting portion 204 of an external vacuum chamber 206, e.g., by bolts 208. In this description the term "external" in connection with a sealed chamber will be used where the chamber is external to the device, while the term "inner" will be used for a sealed chamber located inside the device itself. It is understood that the connection between flanges 202 and 204 is properly sealed in accordance with conventional vacuum technique, e.g., by a knife-edge type seal 205. Vacuum chamber 206 may be designed for treating a chemical or semiconductor specimen (not shown), or for measuring its properties in vacuum.

First mounting flange 202 rigidly supports a stationary cylindrical housing 210, which has windows 212, 214, and 216 for reducing its weight and for facilitating the insertion of bolts 208 into tapped holes of flange 204.

At the end opposite to external vacuum chamber 206, stationary housing 210 has a second mounting flange 218. Flange 218 rotatingly supports one end of a first driven shaft 220 in a bearing 222. The other end of shaft 220 is rotatingly supported by bearings 224 and 226, which are installed in a stationary sleeve 228. Stationary sleeve 228 is rigidly attached at 230 to first mounting flange 202, e.g., by welding. Bearings 224 and 226 are separated by a spacer 232.

First shaft 220 is hollow and supports a second shaft 234 on bearings 236 and 238.

On its outer end, second mounting flange 218 also supports a second feedthrough device 240. Depending on the purpose of rotary motion feedthrough mechanism 200, unit 240 may comprise either another feedthrough device, or a fluid-transmitting feedthrough device. In the embodiment illustrated in FIGS. 2 and 3, replaceable unit 240 is a prior-art rotary motion feedthrough device of the type described in the above Balter patent. In fact, this unit is similar to one shown in FIG. 1. Output shaft 10 of device 12 is connected through a coupling (not shown) with a second driven shaft 234. A mounting flange 241 of unit 240 is connected to second mounting flange 218 through an appropriate seal, such as a knife-edge type seal ring 243.

Rigidly attached to the outer surface of first shaft 220, e.g., by welding, is a sleeve 242, which is eccentric to the axis of rotation of shafts 220 and 234. Sleeve 242 is rotatingly supported in a cylindrical bushing 244 by bearings 246 and 248. Since bushing 244 is supported by eccentric sleeve 242, it is also offset with respect to the center of rotation of shafts 220 and 234. Bush 244 in turn rotatingly supports an external cylindrical body 250 on bearings 251 and 253. Cylindrical body 250 is additionally supported by bearings 252 and 254 which support the outer surface of stationary sleeve 228.

Cylindrical body 250 carries a gear wheel 256 which is rigidly attached thereto, e.g., by bolts 258. Gear wheel 256 engages a driving gear or pinion 260 which is located in a separate housing 262 and is carried by a shaft 264. The outer end of shaft 264 extends beyond the housing and carries a handwheel 266. Handwheel 266 is shown as a source of drive only by way of example; pinion 260, and hence gear wheel 256, can also be driven by a stepper motor or other rotary drive means.

For sealing the interior of external vacuum chamber 206, the device also has two bellows 268 and 270. First bellows 268 is located between the inner side of second mounting flange 218 and the facing end of bushing 244, while second bellows 270 is located between facing ends of stationary sleeve 228 and bushing 244. Each bellows is illustrated by parallel broken lines and comprises a cylinder with corrugations to enable it to be flexible.

Thus an inner vacuum chamber is formed in a space defined by second mounting flange 218, first bellows 268, bushing 244, second bellows 270, and stationary sleeve 228. This chamber is connected to main or external vacuum chamber 206. Both chambers are reliably sealed against the atmosphere by seal ring 243, bellows 268, bellows 270, and seal 205.

The rotating parts of the device are the following: an output element (not shown) of replaceable drive unit 240, second driven shaft 234, handwheel 266, shaft 264, pinion 260, gear wheel 266, external cylindrical body 250, and first driven shaft 220. Second mounting flange 218, first bellows 268, bushing 244, second bellows 270, stationary sleeve 228, first mounting flange 202, and stationary cylindrical housing 210 do not rotate, except that bushing 244 executes orbital motions which will be described below.

OPERATION OF THE FEEDTHROUGH DEVICE OF FIGS. 2 AND 3

Assume that first driven shaft 220 is connected to a first sample holder (not shown) and second driven shaft 234 is connected to a second sample holder (not shown). Assume also that both samples must be rotated simultaneously at different speeds and/or in different directions with respect to an electron beam source, or a similar source of energy for treating samples in a vacuum. The rotary motion feedthrough device of the embodiment shown in FIGS. 2 and 3 fulfills this task and operates as follows:

Replaceable drive unit 240, which in the illustrated case is the feedthrough apparatus of the type shown in FIG. 1, is driven into rotation by rotating cap 18 manually or by a programmed stepper motor (not shown). Since second driven shaft 220 is connected directly to output shaft 10 of drive unit 240, shaft 220 will be rotated on bearings 236 and 238 within first shaft 220 in a given direction and at a given speed from unit 240. During rotation, vacuum chamber 206 will remain sealed by the above-mentioned sealing devices, i.e., seal ring 205, bellows 270, bellows 268, and seal ring 243.

Simultaneously, external cylindrical body 250 is rotated from handwheel 266 via pinion 260 and gear wheel 256 which engages pinion 260 and is attached to cylindrical body 250. Because cylindrical body 250, which rotates on bearings 252, 254, 251, and 253, is rotatingly supported by bushing 244, which is eccentric with respect to the axis of rotation of shafts 234 and 220, bushing 244 will describe planetary motions around the above-mentioned axis. This planetary motion will cause first driven shaft 220 to rotate in the same direction as the bushing with a 1:1 ratio. In other words, planetary motion mechanism works as a crank mechanism. As a result, shaft 220 will rotate at the given speed. Since bushing 244 is connected to stationary parts, i.e., second mounting flange 218 and stationary sleeve 228 via flexible parts such as first and second bellows 268 and 270, respectively, external vacuum chamber 206 will remain sealed.

Thus I have shown that the device of FIGS. 2 and 3 provides transmission of two independent rotary motions from separate external drive sources into an external sealed chamber. The device is simple in construction and universal in operation.

Figure 4:
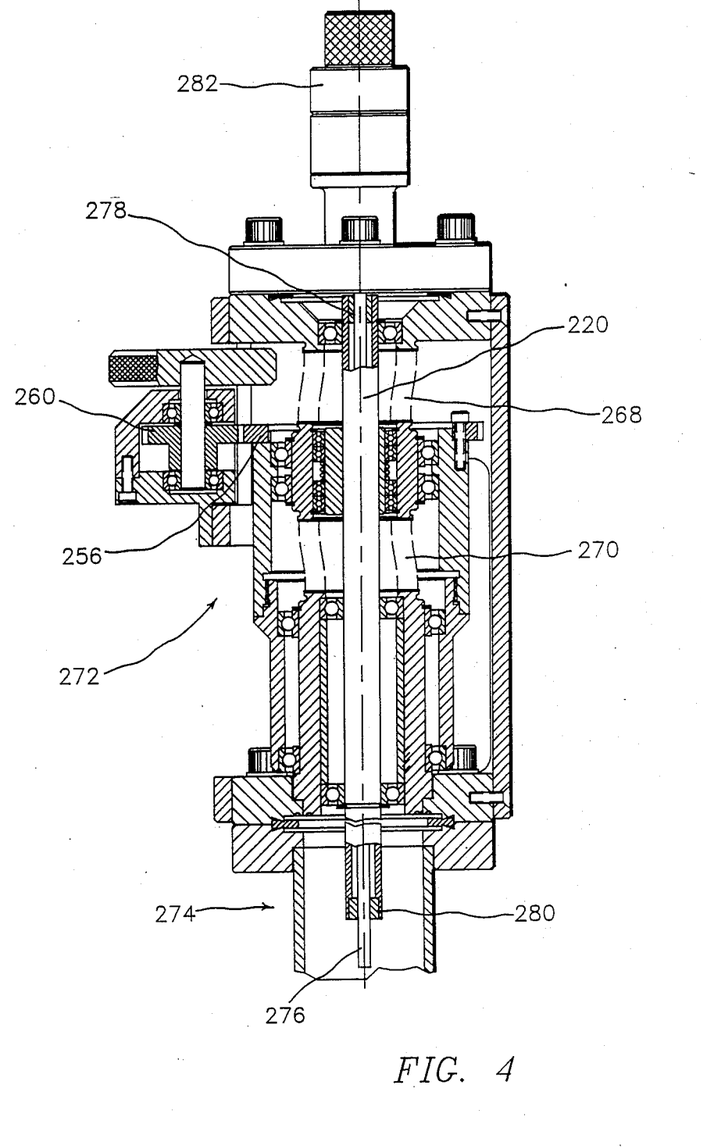
FIG. 4 is a longitudinal sectional view of a rotary motion device according to another embodiment which incorporates a rotary motion with a linear motion.

FIG. 4—DESCRIPTION AND OPERATION OF ROTARY MOTION FEED-THROUGH APPARATUS FOR COMBINED LINEAR AND ROTARY MOTIONS

A rotary motion feedthrough apparatus 272 is also shown in FIG. 4 and is generally the same as the one shown in FIG. 3, except that it can transmit rotary and translatory motions into a sealed vacuum chamber 274. Those parts of apparatus 272 which are identical to those of apparatus 200 are designated by the same reference numerals.

Apparatus 272 differs from apparatus 200 in that, instead of second drive shaft 234, it has a sliding rod 276. Rod 276, similar to second driven shaft 234, passes through hollow first shaft 220 into vacuum chamber 274. Rod 276 is supported within shaft 220 into slide bearings 278 and 280. The end rod 276 opposite to chamber 274 is connected to an axial drive unit 282, such as a Model VF-108 micrometric linear movement device produced by Huntington Mechanical Laboratories, Inc., Mountain View, Calif.

Bellows 268 and 270 fulfill the same functions as in apparatus of FIGS. 2 and 3.

In operation, shaft 220 is rotated via gear wheel 256 and pinion 256 in the same manner as in apparatus 200 of FIG. 2. At the same time, linear motion can be transmitted to rod 276 from drive unit 282. The end of rod 276, which is located in external vacuum chamber 274, may carry a sample (not shown) which is accurately moved in the axial direction of rod 276 by the required distance with respect to an electron beam gun or a similar sample treatment device (not shown); the sample treatment device is located in vacuum chamber 274. Thus apparatus 272 provides two combined motions, i.e., rotation of shaft 220 and linear motion of rod 276. The apparatus is compact, simple in construction, and reliable in operation.

Figure 5:
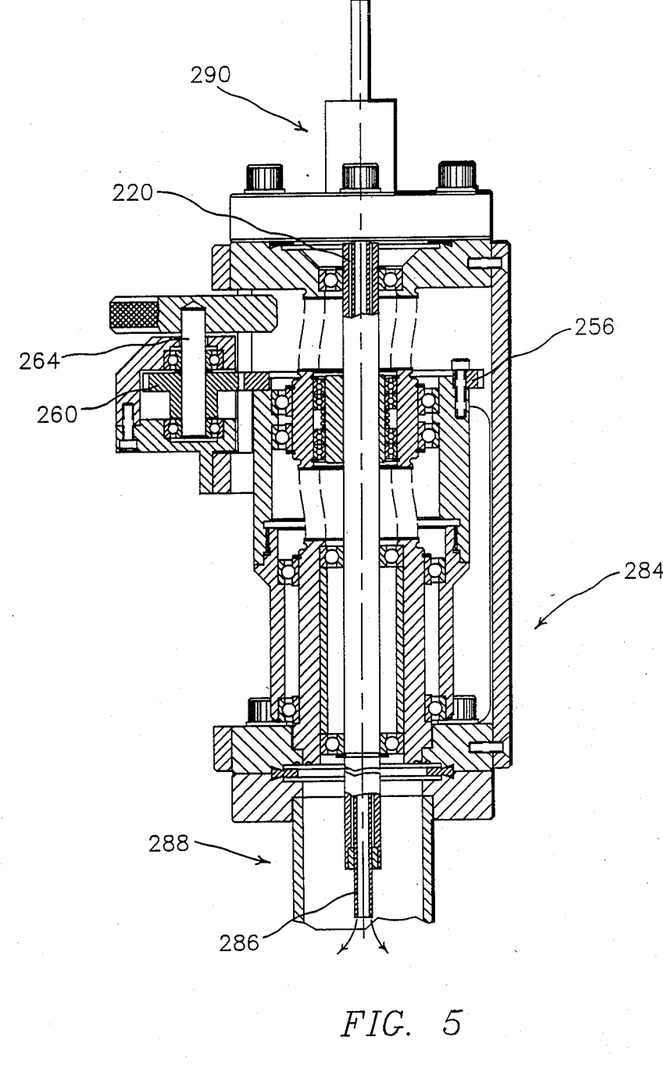
FIG. 5 is a longitudinal sectional view of a rotary motion device which can supply fluid into a sealed chamber.

FIG. 5—DESCRIPTION AND OPERATION OF ROTARY MOTION FEEDTHROUGH APPARATUS COMBINED WITH FLUID FEEDTHROUGH

A rotary motion feedthrough apparatus 284 shown in FIG. 5 is generally the same as the one shown in FIG. 4, except that it combines rotary motions with fluid feedthrough. For this purpose, rod 276 is replaced by a tube 286. One end of tube 286 opens into an external vacuum chamber 288, while the opposite end of tube 286 is connected to a source (not shown) of supply of liquid or gas, e.g., liquid nitrogen, via a fluid feedthrough device of the FT-191 type type produced by Huntington Mechanical Laboratories, Inc., Mountain View, Calif.

In operation, shaft 220 is rotated from handwheel 266 via shaft 264, pinion 260, gear wheel 256, and cylindrical bushing 244 in the same manner as in apparatus 200 of FIG. 2. At the same time, a fluid, such as liquid nitrogen, is supplied to chamber 286 via a fluid feedthrough device 290 in the direction of the arrows in FIG. 5. The device of FIG. 5 is shown with a stationary tube only by way of example. Tube 286 can also be rotated from a rotary motion feedthrough device of the type shown at 240 in FIG. 2. At the same time, the interior of the hollow rotating tube can be used for the supply of liquid nitrogen or a similar cooler via a fluid feedthrough device 290 (FIG. 5). In that case device 290 will be sealingly coupled to the rear end of rotary feedthrough device 240. Many other combinations are possible.

SUMMARY, RAMIFICATIONS, AND SCOPE

Thus I have shown that the rotary motion feedthrough device of the invention is simple in construction, universal in use, can transmit from an outer space to the sealed chamber two or more independent motions, can transmit rotary motion(s) in combination with translatory motion(s), and is suitable for supplying fluids from an external source into a sealed chamber. The invention also provides a combined rotary and/or linear motion feedthrough mechanism which utilizes only metal seals that can be subjected to high or low temperature.

Although the invention has been shown and described in the form of specific embodiments, it is understood that its parts, materials and configurations are given only as examples, and that many other modifications of the combined rotary motion feedthrough device are possible. For example, more than two rotary motion feedthrough devices can be connected in series for transmitting more than two rotary motions. More than two linear motion feedthrough devices can be connected in series for transmitting more than two linear motions into a vacuum chamber. In other words, rotary feedthrough devices, linear feedthrough devices, and fluid feedthrough devices can be connected in series in any required combinations and quantities. Although the invention has been described and illustrated for use in a high vacuum, it can be used for transmitting motions into a high-pressure chamber, or for manipulation of radioactive or hazardous substances within a nonpressurized sealed chamber. The fluid feedthrough can be used for the supply of both liquid or gaseous media. Therefore the scope of the invention should be determined, not by the examples given, but by the appended claims and their legal equivalents.

I claim:

1. A mechanism for feedthrough of rotary and/or linear motions into an external sealed chamber located outside said mechanism via an inner sealed chamber formed inside said mechanism comprising:

a first driven member having an axis of rotation, a through opening coaxial to said axis of rotation, and a body of revolution which is rigidly attached to the outer surface of said first driven member and has its central longitudinal axis offset with respect to said axis of rotation;

said inner sealed chamber surrounding said first driven member and having rigid portions and flexible portions, one of said rigid portions being rotatingly supported by said body of revolution;

means for causing said one of said rigid portions to describe planetary motions with respect to said axis of rotation;

a second driven means, inserted into said through opening of said first driven member so that it can move with respect to said opening;

means for driving said second driven member; and a stationary housing which has first connection means on one end for sealingly connecting said inner sealed chamber to said external sealed chamber, and second connection means for sealingly connecting said inner sealed chamber to said second drive means.

2. The mechanism of claim 1 wherein said means for causing said one of said rigid portions to describe planetary motions comprises cylindrical bushing which is rotatingly supported by bearings on said body of revolution, an external cylindrical body which is rotatingly supported by bearings on said cylindrical bushing, and a rotary drive means for rotating said external cylindrical body, so that when said external cylindrical body is rotated, said bushing describes planetary motions and said first driven member rotates at a given speed and in a given direction.

3. The mechanism of claim 2 wherein said rotary drive means comprises a handwheel for manually rotating said external cylindrical body.

4. The mechanism of claim 1 wherein said flexible portion comprises a llows.

5. The mechanism of claim 1 wherein said driving means for driving said second driven member is a rotary motion feedthrough mechanism which has an output member and is capable of transmitting rotation to a sealed space, said output member being connected to said second driven member.

6. The mechanism of claim 1 wherein said driving means for driving said second driven member is a linear-motion feedthrough mechanism capable of transmitting a linear motion into a sealed space.

7. A mechanism for feedthrough of rotary motion into an eternal sealed chamber located outside said mechanism via an inner sealed chamber formed inside said mechanism comprising:

a driven member having an axis of rotation, a through opening coaxial to said axis of rotation, and a body of revolution which is rigidly attached to the outer surface of said driven member and has its central longitudinal axis offset with respect to said axis of rotation;

said inner sealed chamber surrounding said driven member and having rigid portions and flexible portions, one of said rigid portions being rotatingly supported by said body of revolution;

means for causing said one of said rigid portions to describe planetary motions with respect to said axis of rotation;

a source of fluid supply for the supply of fluid into said external sealed chamber;

a tubular body inserted into said through opening of said driven member, one end of said tubular member being open into said external sealed chamber, the other end of said tubular member being sealingly connected to said source of fluid supply; and a stationary housing which has first connection means on one end for sealingly connecting said inner sealed chamber to an external sealed chamber, and second connection means for connecting said source of fluid supply to said external sealed chamber via said tubular body.

8. The mechanism of claim 7 wherein said means for causing said one of said rigid portions to describe planetary motions comprise a cylindrical bushing which is rotatingly supported by bearings on said body of revolution, an external cylindrical body which is rotatingly supported by bearings on said cylindrical bushing, and a rotary drive means for rotating said external cylindrical body, so that when said external cylindrical body is rotated, said bushing describes planetary motions and said first driven member rotates at a given speed and in a given direction.

9. The mechanism of claim 8 wherein said rotary drive means comprises a handwheel for manually rotating said external cylindrical body.

10. The mechanism of claim 7 wherein said flexible portion comprises a bellows.

11. A mechanism for feedthrough of rotary motion into an external sealed chamber outside said mechanism through an inner sealed chamber formed inside said mechanism comprising:

a first driven shaft having an axis of rotation, a through opening coaxial to said axis of rotation, and a sleeve rigidly attached to the outer surface of said first driven shaft, the central longitudinal axis of said first driven shaft being offset with respect to said axis of rotation;

said inner sealed chamber surrounding said first driven shaft and having rigid portions and flexible portions, one of said rigid portions being rotatingly supported by said sleeve;

means for causing said one of said rigid portions to describe planetary motions with respect to said axis of rotation;

a second driven shaft inserted into said through opening of said first driven shaft so that it can move with respect to said opening;

means for driving said second driven member; and a stationary housing which has first connection means on one end for sealingly connecting said inner sealed chamber to said external sealed chamber, and second connection means for sealingly connecting said inner sealed chamber to said second drive means.

12. The mechanism of claim 11 wherein said means for causing said one of said rigid portions to describe planetary motions comprise a cylindrical bushing which is rotatingly supported by bearings on said sleeve, an external cylindrical body which is rotatingly supported by bearings on said cylindrical bushing, and a rotary drive means for rotating said external cylindrical body, so that when said external cylindrical body is rotated, said bushing describes planetary motions and said first driven shaft rotates at a given speed and in a given direction.

13. The mechanism of claim 12 wherein said rotary drive means comprises a handwheel for manually rotating said external cylindrical body.

14. The mechanism of claim 11 wherein said flexible portion comprises a bellows.

15. The mechanism of claim 14 wherein said bellows are made from metal.

16. The mechanism of claim 15 wherein said metal is stainless steel.

17. The mechanism of claim 11 wherein said driving means for driving said second driven shaft is a rotary motion feedthrough mechanism which has an output member and is capable of transmitting rotation to a sealed space, said output member being connected to said second driven shaft.

18. The mechanism of claim 11 wherein said driving means for driving said second driven shaft is a linear-motion feedthrough mechanism capable of transmitting linear motions into a sealed space.

* * * * *